April 8, 1941.　　　　　C. KURZWEIL　　　　　2,237,758
FLUID SEAL CONSTRUCTION
Filed Oct. 16, 1939
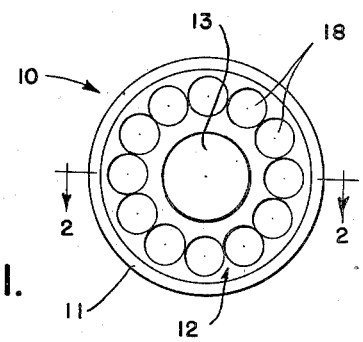
FIG. I.
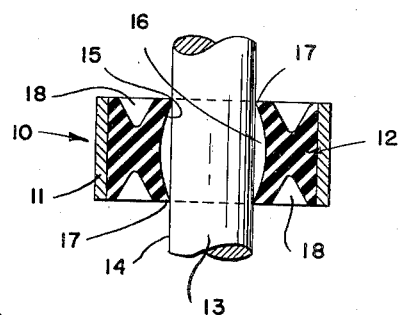
FIG. 2.
INVENTOR.
CHRIS KURZWEIL
BY
ATTORNEYS Patented Apr. 8, 1941

2,237,758

UNITED STATES PATENT OFFICE 2,237,758

FLUID SEAL CONSTRUCTION

Chris Kurzweil, Pontiac, Mich., assignor to Baldwin Rubber Company, Pontiac, Mich., a corporation of Michigan Application October 16, 1939, Serial No. 299,727

2 Claims. (Cl. 288—3)

This invention relates generally to seals and refers more particularly to improvements in seals of the type employed to prevent the escape of fluid along a cylindrical surface.

It is one of the principal objects of this invention to provide a relatively simple inexpensive seal which is highly effective to prevent the escape of fluid along a cylindrical surface of a member regardless of whether the latter is stationary, rotatable and/or reciprocable.

Another object of this invention resides in the provision of a seal of the type set forth wherein the area of the seal contacting the cylindrical surface is so small that the resulting friction is practically negligible. This feature is of particular importance when the seal is used in connection with a rotatable and/or reciprocable member in that it reduces wear of the seal to a minimum.

Still another object of this invention which contributes materially to maintaining a fluid-tight seal around the cylindrical surface of the member with the minimum amount of wear of the seal resides in the provision of a seal in the form of a resilient bushing having the inner surface relieved intermediate the ends thereof in a manner to provide each end of the bore with an annular lip or edge continuously engageable with the cylindrical surface on the member throughout the circumference of said surface. In accordance with this invention, each annular edge or lip has a substantially line contact with the cylindrical surface throughout the circumference thereof and both edges cooperate to prevent leakage in opposite directions along the cylindrical surface past the seal. In certain applications of the seal, one of the lips may be used to prevent the escape of fluid past the seal in one direction and the other lip may be employed to prevent the escape of dust or foreign matter past the seal in the other direction.

A further advantageous feature of the present invention resides in the provision of a seal of the above type so constructed that it will maintain an effective seal around the cylindrical surface even after the resilient material of the seal becomes set due to ageing and, in addition, accomplishes this result without introducing excessive friction. In accordance with the present invention, the opposite ends of the seal are provided with a series of recesses spaced around the sealing lips. These recesses afford sufficient flexibility or working of the resilient material to permit substantial compression of the sealing lips without introducing excessive friction and without disturbing the continuous contact of the lips with the cylindrical surface. In other words, the above construction renders it possible to provide a greater differentiation between the internal diameter of the lips and the external diameter of the cylindrical surface.

The foregoing, as well as other objects, will be made more apparent as this description proceeds, especially when considered in connection with the accompanying drawing, wherein:

Figure 1 is an end elevational view of a seal constructed in accordance with this invention;

Figure 2 is a cross sectional view taken substantially on the plane indicated by the line 2—2 of Figure 1.

The reference character 10 designates a seal comprising a retainer 11 and a block of resilient material 12 secured within the retainer 11. In the present instance, the retainer 11 is in the form of a steel ring and the block 12 is in the form of a bushing fashioned of rubber or rubber-like material. The bushing is preferably vulcanized in the retaining ring 11 and is adapted to receive a member 13 having a cylindrical surface 14. For the purpose of illustration, the member 13 is shown in the drawing as being a shaft having a cylindrical surface and this shaft may be stationary, rotatable and/or reciprocable. Referring more particularly to Figure 2, it will be noted that the surface 15 of the bushing, surrounding the bore, is relieved intermediate the ends of the bore to provide a substantial clearance 16 between the bushing and the cylindrical surface 14 on the member 13. In the present instance, the surface 15 of the bore has a constant radius of curvature from one end of the bore to the other and this radius is predetermined to provide annular edges in the form of lips 17 on the bushing at opposite ends of the bore of less diameter than the diameter of the cylindrical surface 14 on the shaft 13. As a result, the edges 17 have a continuous substantially line contact with the cylindrical surface 14 at points spaced axially of the shaft 13 and cooperate to form a double-acting seal. For example, one of the lips may be used to prevent the escape of fluid past the seal in one direction and the other lip may be employed to prevent the escape of foreign matter past the seal in the opposite direction.

It is one of the important features of the present invention to permit compressing the sealing lips 17 to such an extent that the latter will maintain a continuous engagement with the cylindrical surface on the shaft 13 even after the rubber material becomes set due to ageing in use and to accomplish this result without introducing undue friction in the assembly. The above features are obtained in accordance with this invention by fashioning a plurality of depressions 18 in each end of the bushing around the sealing lips 17. The depressions 18 are shown in Figure 1 as being closely spaced and are preferably in the form of conical recesses. With the above construction in mind, attention is called to the fact that rubber material ages during use and takes a definite set. It follows, therefore, that unless the sealing edges 17 are initially placed under sufficient compression to compensate for setting of the rubber material without destroying the frictional engagement of the edges with the cylindrical surface, the seal will become defective. The recesses or depressions 18 previously referred to render it possible to place the edges or lips under sufficient initial compression to maintain an effective seal, regardless of setting of the rubber material and permit obtaining this result without introducing excessive friction.

Thus, from the foregoing, it will be observed that I have provided a relatively simple and inexpensive seal which is highly effective over a long period of use. It will also be noted that my improved seal comprises a relatively few parts and may be inexpensively manufactured and assembled.

What I claim as my invention is:

1. A seal cooperating with a cylindrical surface on a member to prevent the escape of fluid along the surface past the seal, comprising a bushing of rubber material adapted to receive the member and having inwardly extending annular edge portions at opposite ends of the bore frictionally engageable with the cylindrical surface throughout the circumference of the latter, and a plurality of conically-shaped recesses formed in each end of the bushing around said edge portions.

2. A seal cooperating with a cylindrical surface on a member to prevent the escape of fluid along the surface past the seal, comprising a bushing of rubber material adapted to receive the member, said bushing having the surface surrounding the member curved outwardly in the direction of the axis of the bushing from one end of the bushing to the other end of said bushing to provide the opposite ends of the bushing with axially spaced annular edges of less diameter than the cylindrical surface of the member and frictionally engageable with the cylindrical surface, and a plurality of conically shaped recesses in each end of the bushing and spaced from each other around the axis of the bushing for allowing the working of the rubber material required to permit the annular edges on the bushing to be placed under sufficient initial compression to insure maintaining an effective seal around the cylindrical surface regardless of the set taken by the rubber material during use.

CHRIS KURZWEIL.